Feb. 10, 1942. F. DE JUTE 2,272,693
UNDERFRAME FOR POWER SHOVELS
Filed Jan. 6, 1941 2 Sheets-Sheet 1

Inventor
FRANK DE JUTE
By
W. B. Harpman
Attorney

Feb. 10, 1942.  F. DE JUTE  2,272,693
UNDERFRAME FOR POWER SHOVELS
Filed Jan. 6, 1941  2 Sheets-Sheet 2
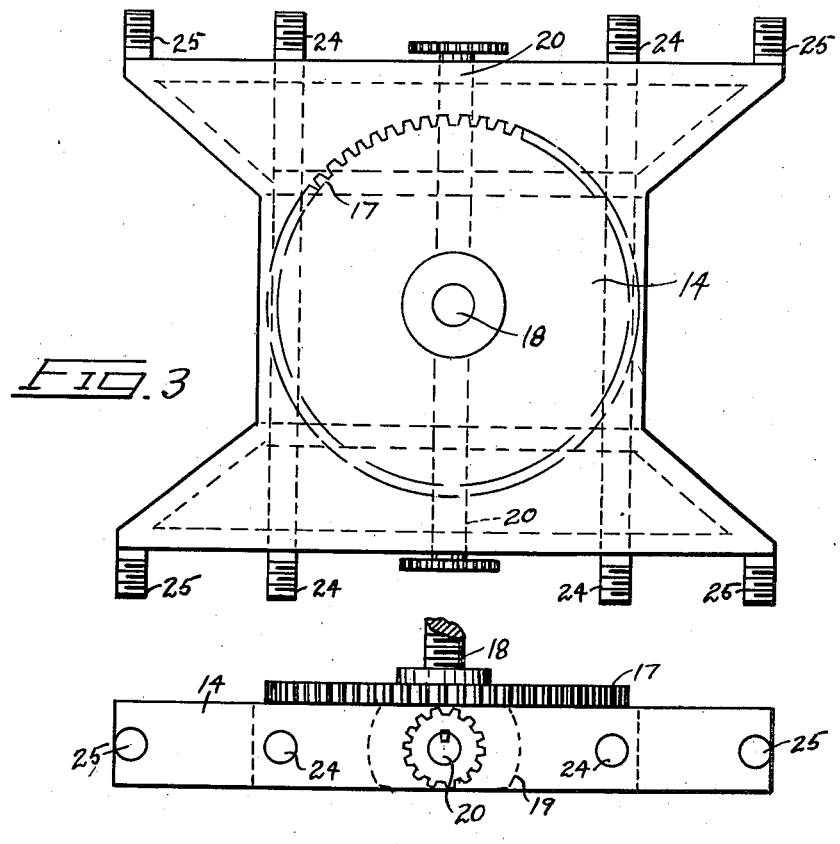
Fig. 3
Fig. 4
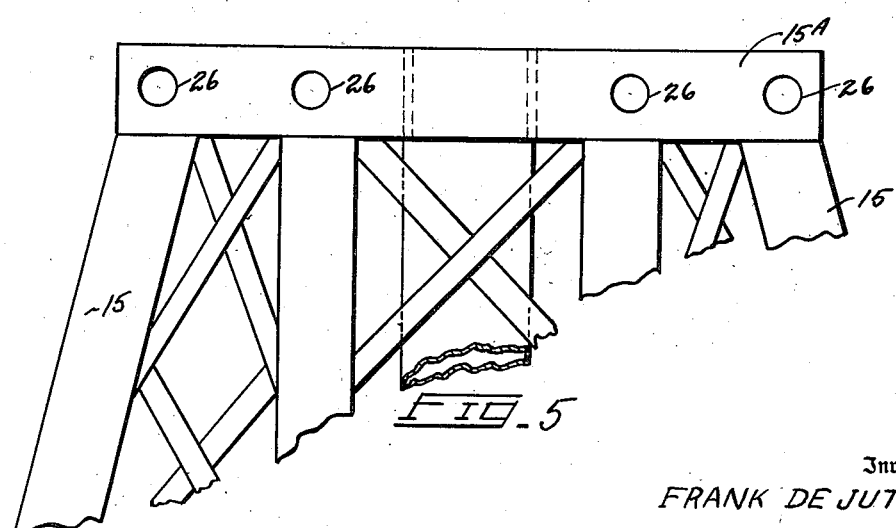
Fig. 5
Inventor
FRANK DE JUTE
By W. B. Harpman
Attorney Patented Feb. 10, 1942

2,272,693

UNITED STATES PATENT OFFICE 2,272,693

UNDERFRAME FOR POWER SHOVELS

Frank De Jute, Niles, Ohio

Application January 6, 1941, Serial No. 373,259

3 Claims. (Cl. 214—135)

This invention relates to an underframe for a power shovel.

The principal object of the invention is the provision of an underframe for a power shovel designed to be interchangeable with the conventional underframes commonly used on various power shovels.

A further object of the invention is the provision of an interchangeable underframe for a power shovel designed to provide an elevated base for the power shovel so as to enable the same to be used for removing debris from railroad gondolas.

A still further object of the invention is the provision of an interchangeable underframe for a power shovel wherein the component parts are so formed and assembled that they may be readily dismantled to permit shipment of the underframe from one point to another.

The power shovel underframe shown and described herein has been designed primarily to make possible the rapid and economical cleaning of debris from railroad gondolas such as commonly necessary in connection with the operation of large industrial plants wherein several carloads of miscellaneous refuse material are accumulated each day and moved to a location where the refuse material is used as a fill or simply discarded. In order to conveniently and economically remove the refuse material from the railroad gondolas it is obvious that some form of power driven apparatus is essential and it has been determined that a conventional power shovel incorporating the usual boom and dipper stick carrying a conventional dipper can be most advantageously used when the power shovel is mounted upon an underframe such as shown and described herein. The invention resides in the underframe as an interchangeable unit capable of supporting a conventional power shovel in a manner similar to that of a conventional underframe with the exception that the underframe is of a design and construction which permits it to effectively straddle the railroad gondolas so as to bring the power shovel into effective operative relationship with the gondolas and to further make possible the easy movement of the gondolas themselves by the power shovel as may be necessary from time to time in moving loaded cars into desirable unloading position or in moving unloaded cars away from such position. The underframe therefore comprises a mechanism capable of movement upon application of power from the power shovel it is adapted to carry, and to further provide a supporting structure adequate in all respects for the satisfactory operation of the power shovel.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

The invention is illustrated in the accompanying drawings, wherein:

Figure 3 is a top plan view of a portion of the underframe shown in Figure 2.

Figure 4 is a side elevation, with parts broken away, of the portion of the underframe shown in Figure 3.

Figure 5 is an enlarged partial side elevation of one of the vertical support members.

Figure 1:
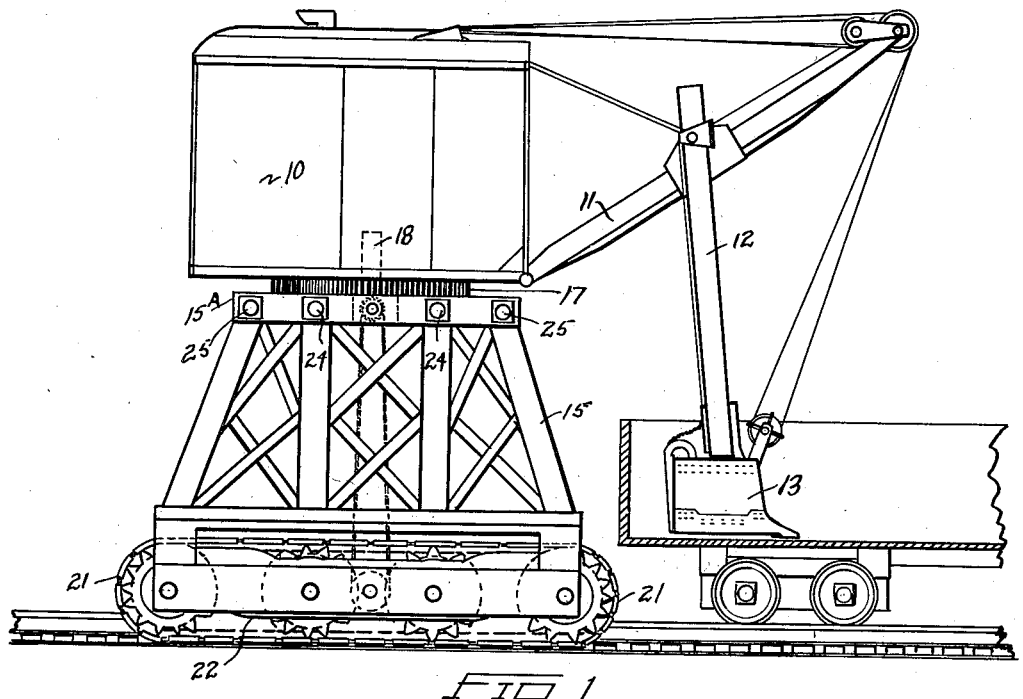
Figure 1 is a side elevation showing a conventional power shovel mounted upon an interchangeable underframe and positioned in effective operative relationship to a railway gondola.
Figure 2:
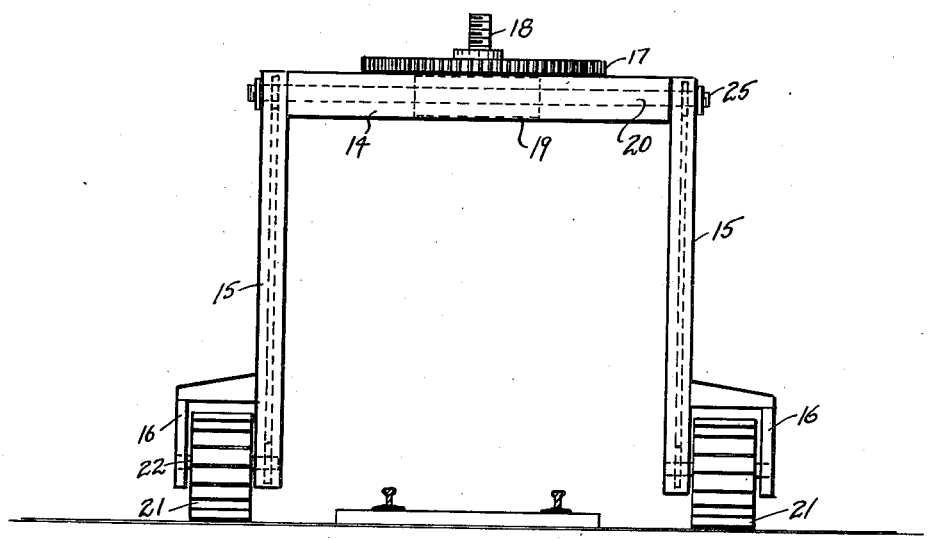
Figure 2 is an end elevation of an interchangeable power shovel underframe illustrating the underframe making possible the wide and high clearance provided to make it possible for the underframe to effectively straddle a railway gondola or other similar railway car.

By referring to the drawings and Figure 1 in particular it will be seen that a power shovel 10 incorporating a conventional boom 11, a dipper stick 12 and dipper 13, together with the conventional associated mechanism, is shown in operative position upon an elevated interchangeable underframe comprising an underframe deck 14, vertically positioned supporting members 15, and tread carrying members 16. The horizontally positioned underframe deck 14 is provided on its upper surface with a conventional roller path and roller path gear 17 and has centrally positioned therein a center pin 18 which forms the power transmission means between the underframe and the power shovel adapted to be positioned thereon. The deck 14 is preferably formed so as to provide for the placement of the necessary transmission gears in protected position within the deck structure as indicated in Figure 2 by the numeral 19. A drive shaft 20, operatively connected to the gears 19, is positioned transversely of the deck 14 in a manner so that its opposite ends project slightly beyond the deck structure at which points they are provided with sprockets or gears for effecting the transmission of power downwardly through suitable means to the tread structures provided. As illustrated, the tread structures comprise caterpillar treads 21 operatively positioned about suitable truck frame assemblies 22 which in turn are adapted to be driven by suitable means connected with the said drive shaft 20. In this connection it will be obvious that while the drive means has been illustrated as comprising sprockets positioned on the drive shaft and the truck frame assemblies 22 and operatively connected by means of suitable chains 23, various other types of driving gears may be utilized which might comprise, for example, vertically positioned shafts provided with gears at their opposite ends engaging the drive shaft 20 and the operating portions of the truck frame assemblies 22. It may be further pointed out that the chains 23 as illustrated or the shafts, if used, may be enclosed with a suitable enclosure so as to protect the same, and that the enclosure may contain oil so that the chains or shafts run in oil. It will thus be seen that the deck 14 is preferably of a more compact form and arrangement than common to the art which provides additional clearance space beneath the same which is desirable. In order that the underframe may provide adequate support for the power shovel it has been determined that caterpillar treads or wheels or flanged trucks used must be spaced apart sufficiently to provide an adequate base for the structure and at the same time be large enough both in length and breadth to spread the weight of the shovel evenly over a relatively wide area. For example, it has been determined that in order to provide a clearance of eleven and one-half feet in width between the vertically positioned support members 15, and a minimum clearance of nine feet in height beneath the lower surface of the deck 14, the caterpillar treads 21 should be approximately thirty inches in width and fourteen feet in length which will obviously provide a large loading area which will adequately support the power shovel.

In order that the underframe may be shipped from one point to another it is preferably formed of several sections so that it can be disassembled. For example, the deck 14 can comprise either a casting or a structure built up of structural steel, either of which are preferably provided with, as illustrated in Figure 3 of the drawings, a pair of transversely positioned axles 24 the opposite ends of which project beyond the sides of the deck 14, and a plurality of stub axles 25 forming a part of angular projections 26 which in turn form a part of the deck 14. These projecting axles 24 and stub axles 25 provide structural mountings for the deck 14 and the vertical supports 15 as they are adapted to register with openings 26 formed in a horizontal section 15A of each of the vertical support members 15 as illustrated in Figure 5 of the drawings. The axles 24 and stub axles 25 are preferably threaded and adapted to be secured in position in the openings 26 of the vertical support members 15 by nuts or by other suitable means. It will be observed that the relatively large contacting areas of the deck 14 and the portion 15A of the vertical supports 15 will provide a satisfactory structural connection which will insure the rigidity of the underframe.

It will also be obvious that a similar arrangement for disassembling the caterpillar treads and truck frame assemblies 22 with respect to the lowermost portions of the vertical support members 15 may be employed if found desirable and, further, that in the event that wheels or flanged wheels are utilized in place of the caterpillar treads illustrated it is essential that conventional means be provided for disassembling the same from the vertical support members as it may be necessary to disassemble the underframe for shipment if and when desired.

It will thus be seen that a conventional power shovel of any of the types well known in the art may be easily and quickly mounted upon the underframe shown and described herein and that once mounted will, with the underframe, form an extremely efficient combination capable of independent movement about a railway yard or other location, capable of straddling a string of railway cars and extremely effective in removing refuse material or other material from these cars. It will also be seen that the operator can utilize the power shovel to move the various railway cars into and out of position if desirable, or that the power shovel itself may move along a line of cars cleaning each in its turn. The elevated position of the power shovel in relation to the car to be cleaned permits the efficient and rapid operation of the dipper 13 which is very effective in removing the refuse material which often comprises slag, waste material, uneven lengths of wood and other material frequently found during the winter months frozen together in a tight mass adhering to the floor and side walls of the railway car. The elevated position of the operator enables him to see the work being performed rather than depending upon some one else for verbal direction as is now customary as the operator is usually stationed at one side of and below the railway car being cleaned. The present method of cleaning such refuse cars has comprised the use of a crane carrying a drag line arrangement or clam shell both of which are extremely slow and ineffective in operation as compared with the efficient operation obtained through the use of a dipper of a conventional power shovel, which operation is made possible by the underframe comprising this invention. It will also be seen that the underframe shown and described herein makes possible the use of a power shovel equipped with a long boom so as to be used as a crane for stacking various materials in supply yards as, for example, in large cities where limited room makes the formation of relatively high piles of such materials essential. The elevated location of the power shovel in relation to the sloping sides of the material piles provides ample tail swing for the crane unit and thus permits the closer stacking of the various materials. It will thus be seen that the provision of the underframe makes possible a greater efficiency in the operation of power shovels, cranes, and other similar equipment than would otherwise be possible.

What I claim is:

1. The combination of a power shovel including a boom, a dipper stick, and a dipper affixed thereto and an elevated replaceable underframe adapted to support the said power shovel in elevated relation to a supporting surface, said underframe comprising a deck and a pair of relatively tall vertically positioned frame members positioned one at each side thereof so as to form an elevated underframe.

2. The combination of a power shovel including a crane boom, suitable material engaging means suspended therefrom, and an elevated un- shovel in elevated relation to a supporting surderframe adapted to support the said power shovel in elevated relation to a supporting surface, said underframe comprising a deck and a pair of vertically positioned removable frame members positioned one at each side thereof so as to form an underframe capable of straddling a railway car, in order to bring the said boom into operative relation thereto.

3. The combination with a power shovel of a supporting underframe therefore, said supporting underframe being formed to facilitate dismemberment thereof and comprising a platform having means formed thereon adapted to receive a power shovel and a pair of relatively high vertically positioned frame members affixed at their uppermost ends to the respective sides of the said underframe so as to suitably elevate and support the same, together with continuous ground engaging tread assemblies formed on the lowermost portions of the said vertically positioned frame members, the said tread portions adapted to be motivated from the said power shovel.

FRANK DE JUTE.

CERTIFICATE OF CORRECTION.

Patent No. 2,272,693. February 10, 1942.

FRANK DE JUTE.

It is hereby certified that error appears in the printed specification of the above numbered patent requiring correction as follows: Page 2, second column, line 75, claim 2, strike out "shovel in elevated relation to a supporting sur-"; and that the said Letters Patent should be read with this correction therein that the same may conform to the record of the case in the Patent Office.

Signed and sealed this 5th day of May, A. D. 1942.

(Seal)

Henry Van Arsdale,
Acting Commissioner of Patents.